July 1, 1969 J. B. SAMPSON ET AL 3,453,567

DATA STORAGE MODULE SELECTOR ASSEMBLY

Filed Jan. 12, 1967

INVENTORS
JAY B. SAMPSON
JAMES J. WOO
BY
Robert B. Crouch
ATTORNEY

United States Patent Office 3,453,567

Patented July 1, 1969

3,453,567

DATA STORAGE MODULE SELECTOR ASSEMBLY

Jay B. Sampson and James J. Woo, San Jose, Calif., assignors to International Business Machines Corporation, Armonk, N.Y., a corporation of New York Filed Jan. 12, 1967, Ser. No. 608,916
Int. Cl. H01h 73/12
U.S. Cl. 335—17 9 Claims

ABSTRACT OF THE DISCLOSURE

Apparatus for selecting and identifying any one of a number of data storage modules including an address plug and socket for each module. A matrix of reed switches is located in each socket, the individual switches of each matrix being connected to separate module select lines, and each address plug being uniquely coded to select a particular switch. Any module can be connected to any select line by insertion of the plug corresponding to that line in the socket of that module.

*Background*

Figure 1:
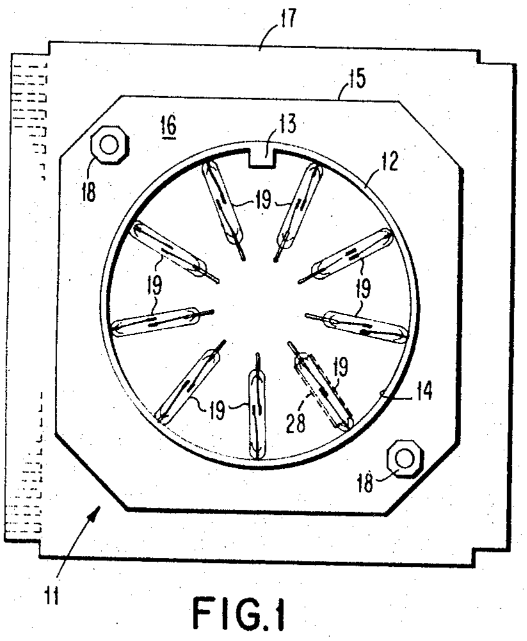

In data processing systems which employ a number of data storage modules, it has been the practice to provide a separate select line for addressing each module. An individual record or block of data has thus been addressed in terms of the module in which it was stored, i.e., by selection of the line associated with the module in which the desired data was recorded. This approach is satisfactory for modules having a fixed recording medium i.e., drums, disks, etc., but is unduly limiting in the case of disk drives or tape drives which employ removable storage media, e.g. disk packs, tape reels, etc, which are interchangeable between drives. In this latter case association of each select line with a particular drive severely restricts the flexibility of the system, in that each disk pack or tape reel is thus effectively limited to use with a single designated drive and cannot be processed on any other drive without rewriting the program for the system. To increase the performance of the system and make better use of the interchangeability of the media, switches have been provided on the drive to allow each drive to be connected to any of the select lines. By this means the program can be written to call for the processing of data on a given drive, for instance, logical drive No. 1. However, by means of the switches any of the drives can be designated as logical drive No. 1 and thus connected to select line No. 1 without changing the program. The switches used for this purpose have been of the rotary type in which a moveable contact is manually stepped about a circular array of fixed contacts. With rotary switches of this type, switching from a first contact position to a second contact position generally necessitates stepping through one or more other contact positions, thus momentarily connecting the drive to a number of select lines in sequence. Since several drives may be in use simultaneously, great care must be taken in switching a given drive to a new position to avoid having two drives momentarily connected to the same select lines. In addition, since the various switches are operated separately, provision must be made to prevent two or more switches from being set to the same position simultaneously. This necessity of providing interlocks among the switches to lock out any position previously selected by another switch has greatly complicated the construction of the switches, making them expensive to build and at the same time decreasing their overall functional reliability.

*Summary*

The present invention avoids the shortcomings of the prior known devices by provision of a module selector assembly which precludes the possibility of more than a single drive or module being connected to a particular select line at any one time. This is achieved in the present invention with a significant improvement in functional and mechanical reliability as well as a reduction in cost over the prior known devices. The module selector assembly of the present invention includes a socket associated with each data storage module or drive and a matrix of reed switches located in each socket. The individual switches of each matrix are connected to separate module select lines and the corresponding switches of all matrices are connected to the same select line. A set of address plugs is provided for reception within the sockets, each plug being uniquely coded to correspond with a separate one of the select lines. Means is provided for indexing the plugs relative to the sockets such that a given plug inserted in the socket of any module will select the same reed switch in each matrix.

Other objects and many of the attendant advantages of this invention will be readily appreciated as the same becomes better understood by reference to the following detailed description when considered in connection with the accompanying drawing.

Figure 2:
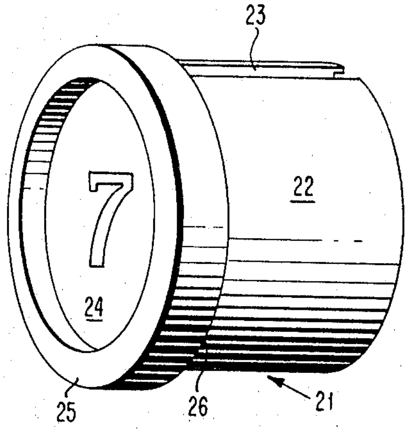
Figure 3:
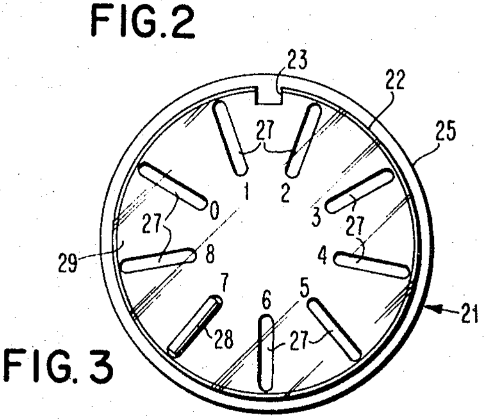
Figure 4:
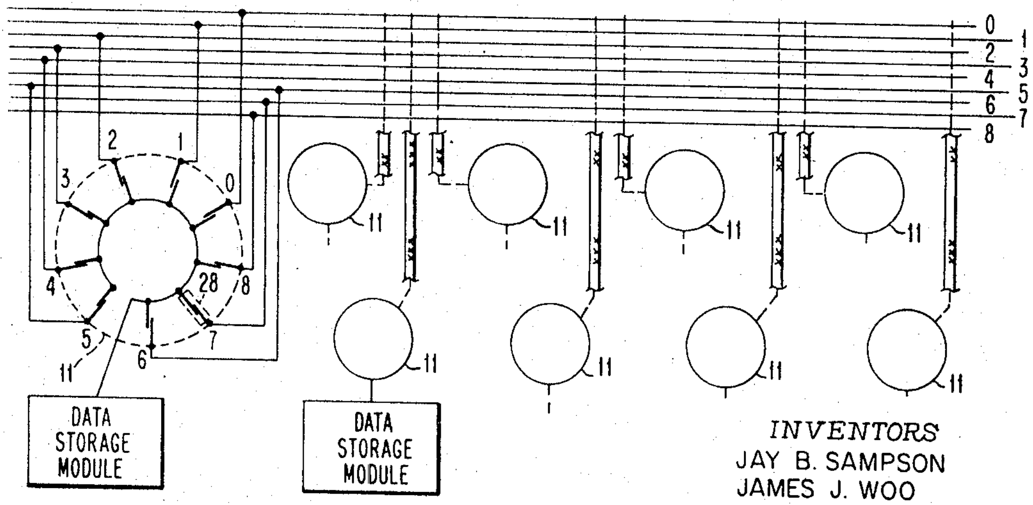

FIG. 1 is an elevation view of a socket according to the present invention showing the location of the reed switch matrix, FIG. 2 is a perspective view of an address plug, FIG. 3 is an elevation view of the rear surface of the plug of FIG. 2, and FIG. 4 is a diagrammatic showing of the circuit connections between the reed switch matrices and the module select lines.

Referring more particularly to FIG. 1 of the drawing, the socket 11 includes a hallow cylindrical receptacle 12 provided with an internally projecting rib or key 13. The receptacle is received within a cylindrical bore 14 which extends through a mounting block or base 15. The outer edge of the receptacle protrudes beyond the front surface 16 of the base. A printed circuit board 17 is secured to the rear surface of the base, as by bolts 18 to form the bottom of the receptacle. A number of reed switches 19 are mounted on the front surface of the circuit board 17 at the bottom of the receptacle. The reed switches each comprise a pair of spring contacts hermetically sealed in a glass envelope. The contacts are of magnetically permeable material and are normally biased to an open position. When subjected to a magnetic field the contacts are closed and the circuit completed through the switch as long as the magnetic field remains in proximity to the contacts. The switches are located on evenly spaced radii of the receptacle and are accessible from the interior of the receptacle. While the reed switches are positioned on the front surface of the circuit board at the bottom of the receptacle, the leads from the switches extend through the circuit board and are soldered or otherwise connected in the circuit pattern deposited on the rear surface of the board.

As shown in FIGS. 2 and 3 the address plug 21 is a generally cylindrical element with closed ends. The cylindrical body 22 of the plug is dimensioned to be received within the interior of the cylindrical receptacle 12 and is provided with a longitudinally extending keyway 23 to receive the key 13. A cover 24 at the front end of the plug is surrounded by an enlarged annular rim 25 which projects beyond the body 22 and forms a radially extending flange 26. The rear surface of the plug removed from the cover 24 is provided with a series of radially extending, elongated recesses 27, FIG. 3. The number and the location of the recesses are chosen to correspond with the number and location of the reed switches at the bottom of the receptacle. A bar magnet 28 is positioned in one of the recesses and is held in place by any suitable means, such as a plastic cover 29 covering the end of the plug. A suitable material for the bar magnet 28 is Alnico V which has been magnetized to saturation.

A selector assembly is provided for each data storage module of a system. The number of storage modules is a matter of choice depending upon the system application. In the present example, FIG. 4, nine modules are contemplated. In this example each switch matrix includes nine reed switches and each system provides nine module select lines numbered zero through eight. Each matrix is connected between a storage module and the select lines with a common connection from the module to one contact of each switch of the matrix and individual connections between the remaining contact of each switch and the select lines. Each reed switch of a given matrix is assigned a logical number, i.e., zero through eight, and is connected to a corresponding module select line. The corresponding switches of the remaining matrices are similarly identified and connected to the same select lines. By this means the same reed switch of each matrix is identified by one logical number and is connected to the same module select line. A set of address plugs for the present example would consist of nine plugs, each of which is individually coded to select a different switch in a given matrix. The coding is accomplished as indicated in FIG. 3 by insertion of a small bar magnet in the recess corresponding to a desired switch of the matrix. Since there are nine plugs in a set and nine recesses (zero through eight) in each plug, the plugs can be uniquely coded by varying the magnet positions from plug to plug. As the plugs of the set are coded, the logical number of the selected recess can be recorded on the front cover of the plug, see FIGS. 2 and 3.

In the operation of the present invention, a given data storage module is connected to a particular module select line by merely inserting the address plug which corresponds to that line in the socket associated with the module. By this means a given processing operation, which has been programmed to be carried out on one or more specified logical storage modules, can actually be performed on whichever of the nine modules are available without requiring any revision of the program. If the program calls for module number seven, for instance, plug number seven can be inserted in the socket of any of the modules to connect that module to select line number seven and thus denote that module as logical module number seven. This permits a processing operation to be carried out with logical module number seven while the next operation is being set up on a second module. In the case of a disk drive, this means that the disk pack containing the necessary data is mounted on the drive and the pack brought up to speed, while in the case of a tape drive, the tape reel is mounted on the drive, the tape threaded and the vacuum columns loaded. When the first processing operation is completed the plug is removed from the socket associated with the first module and inserted in the socket associated with the second. The second module is then on line and ready for the next processing operation. Similarly, if a particular module is out of service for repairs or maintenance, the processing work can be carried on without interruption by using the remaining modules. Switching from one module to another using the same select line requires only that the address plug be withdrawn from one socket and then reinserted in the socket of the second module. Since each plug is uniquely coded, the operator is precluded from ever getting two storage modules on the same select lines simultaneously.

When an address plug is inserted in a socket the flange 26 at the rear of the rim seats against the outer edge of the receptacle and prevents the plug from bottoming in the socket. The magnet is thus positioned closely adjacent the switches, but out of contact with them. The rim also serves as a handle or finger grip for placement and withdrawing of the plug. The fact that the receptacle protrudes from the base of the socket renders the rim accessible and permits the rim to be readily grasped by the machine operator.

The construction of the present invention lends itself to inexpensive manufacture and reliable operation. The receptacle 12 may be a plastic extrusion which is trimmed to the desired length. The base 15 and the body of the address plug are molded from suitable plastic materials. The rim 25 of the plug can be extruded or molded as desired. The circuit board is made by conventional depositing-etching techniques. Contacts for the circuit pattern are provided along the edges of the board to permit simplified engagement or disengagement with circuit connectors in the machines. The reed switches provide hermetically sealed contacts which avoid the problems of corrosion and contamination encountered in conventional switches.

What we claim is:

1. In a data processing system, the combination of a number of data storage modules; a number of module select lines; a module selector assembly comprising:

a plurality of sockets, each socket being associated with a different storage module;

a matrix of reed switches mounted in each socket, each matrix being connected between the associated module and each of the module select lines;

a set of address plugs engaging said sockets and interchangeable thereamong, each plug being uniquely coded to correspond with an individual module select line and when inserted in a socket to select a particular switch of the matrix and complete the connection between the corresponding select line and the module associated with that socket.

2. A module selector assembly as set forth in claim 1 wherein the socket includes a hollow cylindrical receptacle and the matrix is located at the bottom of the receptacle.

3. A module selector assembly as set forth in claim 2 wherein the switches of the matrix are positioned on evenly spaced radii of the receptacle.

4. A module selector assembly as set forth in claim 3 wherein the plugs have generally cylindrical sections for reception within the receptacle and a bar magnet for providing selective coding, located in the inner end of the cylindrical section received within the receptacle.

5. A module selector assembly as set forth in claim 4 wherein each plug has a plurality of recesses formed in the inner end thereof, the recesses lying on evenly spaced radii of the cylindrical section in alignment with the switches of the matrices, the bar magnets being located in the recesses.

6. A module selector assembly as set forth in claim 5 wherein the assembly includes means for indexing the plugs within the receptacle to align the recesses in the plugs with the corresponding switches in each socket.

7. A module selector assembly comprising a socket having a generally cylindrical receptacle;

a matrix of reed switches mounted at the bottom of the receptacle, one contact of each relay being connected to a common lead while the opposite contact of each relay is connected to individual leads;

and a plug engaging the socket, the plug being uniquely coded to correspond with one of the individual leads to energize the switch connected to that lead and complete the connection between the common lead and the selected individual lead.

8. A module selector assembly as set forth in claim 7 wherein the switches of the matrix are positioned on evenly spaced radii of the receptacle and a bar magnet for selective coding located in the inner end of the plug received within the receptacle.

9. A module selector assembly as set forth in claim 8 wherein the plug has a plurality of recesses formed in the inner end thereof, the recesses lying on evenly spaced radii of the plug in alignment with the switches of the matrices, the bar magnet being located in one of the recesses.

References Cited

UNITED STATES PATENTS

| | | | |
|---|---|---|---|
| 3,060,291 | 10/1961 | Clare | 335—152 |
| 3,293,502 | 12/1966 | Beierle | 335—152 |

BERNARD A. GILHEANY, *Primary Examiner.*

H. BROOME, *Assistant Examiner.*

U.S. Cl. X.R.

335—152